No. 719,304. PATENTED JAN. 27, 1903.
B. W. COGHLIN.
FORMING MACHINE.
APPLICATION FILED MAY 19, 1902.
NO MODEL. 3 SHEETS—SHEET 1.
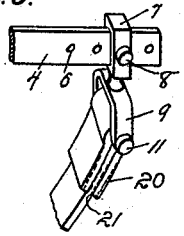
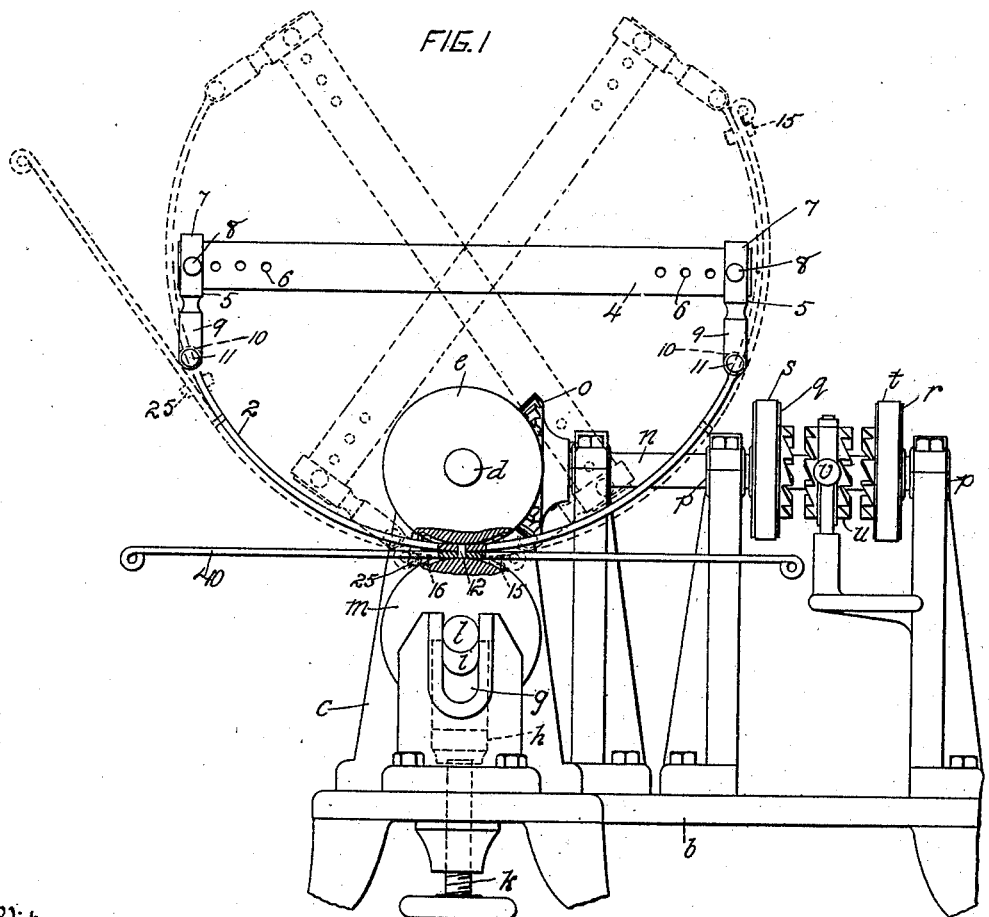

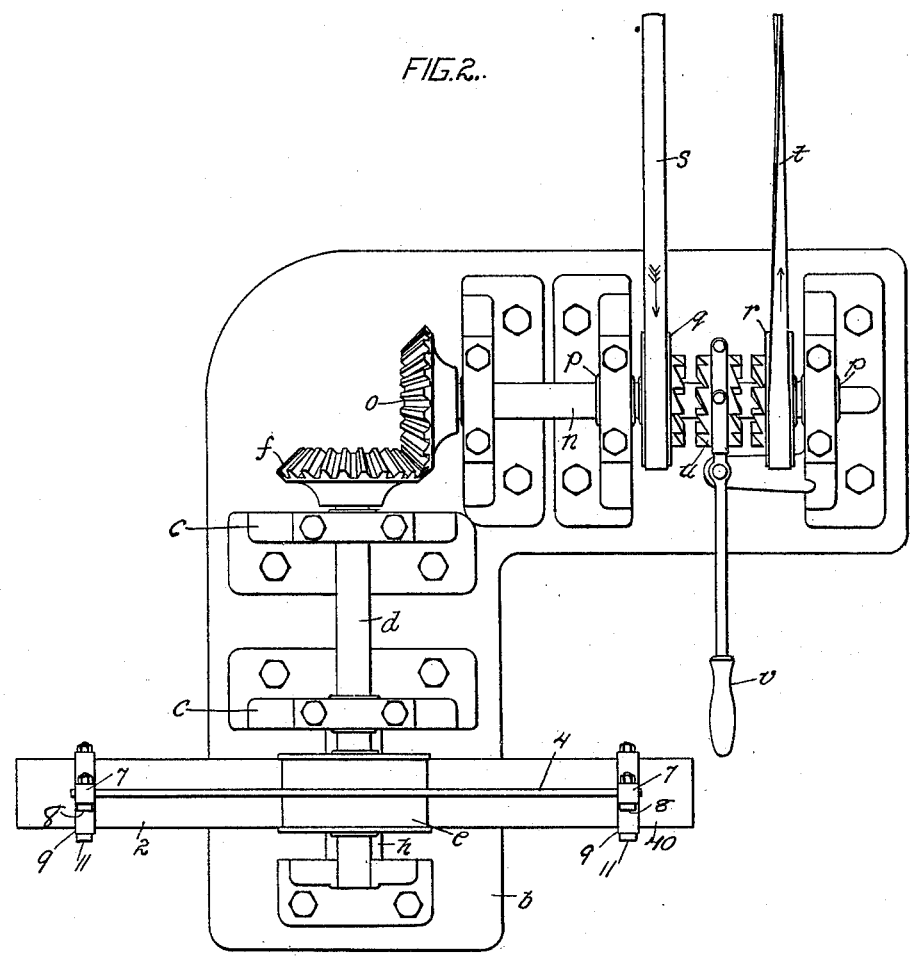

No. 719,304. PATENTED JAN. 27, 1903.
B. W. COGHLIN.
FORMING MACHINE.
APPLICATION FILED MAY 19, 1902.
NO MODEL. 3 SHEETS—SHEET 3.
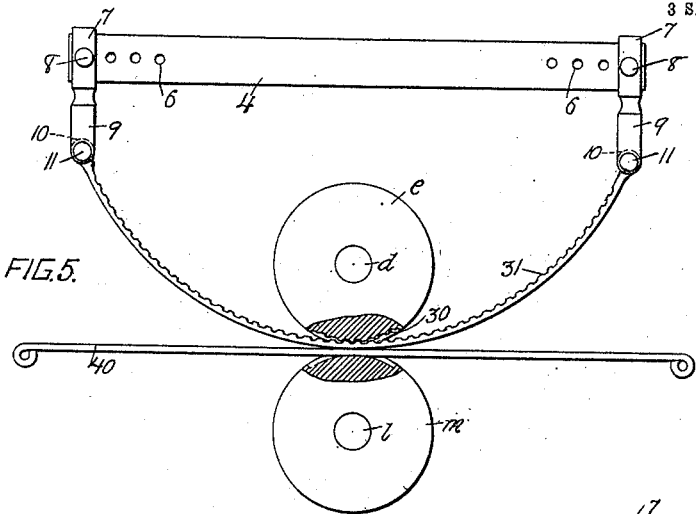
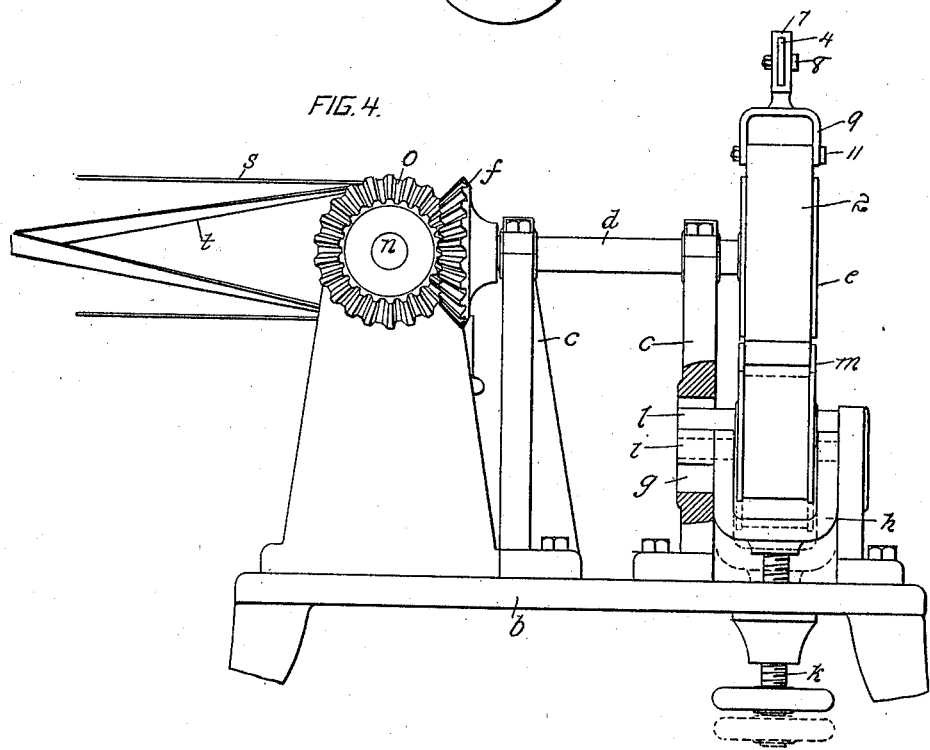
Witnesses
Inventor
Bernard W. Coghlin
By his Attorney

UNITED STATES PATENT OFFICE.

BERNARD WILLIAM COGHLIN, OF MONTREAL, CANADA.

FORMING-MACHINE.

SPECIFICATION forming part of Letters Patent No. 719,304, dated January 27, 1903.

Application filed May 19, 1902. Serial No. 107,977. (No model.)

*To all whom it may concern:*

Be it known that I, BERNARD WILLIAM COGHLIN, of the city of Montreal, district of Montreal, and Province of Quebec, Canada, have invented certain new and useful Improvements in Forming-Machines; and I do hereby declare that the following is a full, clear, and exact description of the same.

My invention may be said briefly to consist in providing a machine comprising a pair of bearers exerting pressure one toward the other and between which there pass simultaneously and in coincident relation a form or pattern and the blank to be formed.

For full comprehension, however, of my invention reference must be had to the accompanying drawings, forming a part of this specification, in which like reference characters indicate the same parts, and wherein—

Figure 1 is a front elevation of my invention adapted for forming spring-leaves, and Fig. 2 is a top plan view thereof. Fig. 3 is a detail end view in perspective of one of the spring-leaves without an eye at its end and illustrating the clip adapted for connecting same. Fig. 4 is a side elevation of the machine, and Fig. 5 a modification illustrating the friction-roll and form with two engaging faces.

The frame $b$ of my invention comprises a pair of pillow-blocks $c$ for supporting a shaft $d$, upon one end of which is mounted a feed-roll $e$ and upon the other end a bevel-gear $f$. Beneath the roll the machine-frame is formed with vertically-elongated bearings $g\ g$, and a U-frame $h$, with offset ends $i$, having their upper surfaces concaved, is located with its offset ends in said bearings $g\ g$, while a lifting-jack $k$, located beneath said U-frame, bears upon and is adapted to raise and lower same. A trunnion $l$, carrying an idle roll $m$, is mounted with its ends projecting into said bearings $g\ g$ and resting upon the ends $i$ of the U-frame.

A drive-shaft $n$, having a bevel-gear $o$ intermeshing with the bevel-gear $f$, is mounted in bearings $p$ upon the frame of the machine and carries a pair of loose pulleys $q$ and $r$, oppositely driven by a straight belt $s$ and a crossed belt $t$, a clutch $u$, operated by a lever $v$, serving to effect a rotative connection between either of said pulleys and the shaft.

The form or pattern in this instance consists of a rigid metallic section 2 in the form of a bow, having a perforation at its middle and set in its given form by a brace or stay 4 in the form of a rigid bar, which is connected to the ends of the bow by fastening devices 5. In order to enable the arc of the bow to be varied, I adapt these fastening devices to be adjusted longitudinally of the brace or stay. To this end I form the bar with a series of transverse perforations 6 and mount a pair of sleeves 7 upon the bar, one at each end, and adapt same to be adjustable longitudinally thereof, said sleeves being set in any position to which they may be moved by pins 8, passing through transverse perforations 6 in the bar. Each of these sleeves is formed with a fork 9, the prongs of which have perforations in their ends. The eyes 10 at the ends of the bow are placed between the said perforated portion of the prongs and held in place by pins 11. These fastening devices may be supplemented with clips consisting of a rigid bent bar 20, adapted to receive the ends of the leaves which are not formed with eyes, the ends of the bent bar being closer together to present a recess somewhat of dovetailed form, as at 21.

The perimeter of the feed-roll can, if desired, be formed with friction or gear teeth 30 and the inside surface of the form roughened or formed with gear-teeth 31 to obviate any chance of slipping.

The operation of forming a spring-leaf is as follows: The heated blank 40, which is to be bent and which has a perforation midway of its length corresponding to the perforation in its form, is connected, preferably, by a removable key in the form of a pin 12. The form and hot blank are first set in their proper position relatively to one another and keyed. They are then gripped slightly to one side of the center by a pair of tongs 25, and the form and blank are then placed between the rolls and the idle roll raised by the screw-jack until it causes both form and blank to be held under comparatively strong pressure. The clutch-gland is then shifted into engagement with the pulley $q$, which will cause the feed-roll to rotate in the direction indicated by a feathered arrow, thus rolling the form and blank through together to the position shown in dotted lines to the left of Fig. 1, and their ends are then secured together preferably by tongs. (Indicated at 15.) The clutch-gland is shifted into engagement with pulley *r*, thus causing the feed-roll to rotate in the direction indicated by the unfeathered arrow, and as the middle portion of the form and blank arrive at the rolls the tongs 25 are disengaged to allow the blank and form to pass and roll the form and blank to the position shown in dotted lines to the right of Fig. 1. When thus brought together, the opposite ends of the blank and form are also secured together by the tongs 25, as indicated in said last-mentioned position. The form, together with the bent leaf, are then removed from the rolls and the leaf tempered while still upon the form. The leaf will then be ready for assembling.

To insure perfect fitting of the leaves in the assembled spring, I prefer to first form the largest leaf, which usually has eyes at its ends, similar to those at the ends of the form hereinbefore described. I then detach the stirrups from the form and attach them to the completed leaf and use the latter as a form upon which I roll the leaf to lie next thereto in the spring, and so on, substituting the leaf last formed for that which has just constituted the form until all the leaves are completed; but as the leaves other than the largest are not made with eyes at their ends I supplement the stirrups with the clips 20 (see Fig. 3) and force the ends of the smaller and intermediate spring leaves thereinto, the pin for connecting the stirrups being first passed through the eye in the clips formed by the bend therein.

Forms and rolls of other contour than illustrated can be used and other blanks manipulated without departing from the spirit of my invention.

What I claim is as follows:

1. A forming-machine comprising bearing members exerting a pressure one toward the other, a form or pattern for receiving thereon the blank to be formed, and means for causing said form or pattern and the blank thereon to pass between and receive pressure from said bearing members, for the purpose of forming said blank in conformity to said form or pattern.

2. A forming-machine comprising pair of rolls exerting a pressure one toward the other, a form or pattern for receiving thereon the blank to be formed, and means for causing said form or pattern and the blank thereon to pass between and receive pressure from said pair of rolls, for the purpose of forming said blank in conformity to said form or pattern.

3. A forming-machine comprising bearing members exerting a pressure one toward the other, a form or pattern in the form of a bow, means for securing the blank to be formed against longitudinal displacement relatively to said form or pattern, and means for causing said form or pattern and the blank thereon to pass between and receive pressure from said bearing members for the purpose set forth.

4. A forming-machine comprising bearing members exerting a pressure one toward the other, a movable form or pattern in the form of a bow, means for securing the blank to be formed against longitudinal displacement relatively to said form or pattern, and means for moving said form or pattern and the blank thereon and causing same to pass between and receive pressure from said bearing members, for the purpose set forth.

5. A forming-machine comprising a pair of rolls exerting a pressure one toward the other, a movable form or pattern in the form of a bow, means for securing the blank to be formed against longitudinal displacement relatively to said form or pattern, and means for moving said form or pattern and the blank thereon and causing the same to pass between and receive pressure from said rolls, for the purpose set forth.

6. A forming-machine comprising a stationary roll and a movable roll, means for moving said movable roll toward and from said stationary roll, a form or pattern for receiving thereon the blank to be formed, and means for causing said form or pattern and the blank thereon to pass between and receive pressure from said pair of rolls, for the purpose set forth.

7. A forming-machine comprising a stationary roll and a movable roll, means for moving said movable roll toward and from said stationary roll, a movable form or pattern in the form of a bow, means for securing a blank to be formed against longitudinal displacement relatively to said form or pattern, and means for moving said form or pattern and the blank thereon and causing same to pass between and receive pressure from said rolls, for the purpose set forth.

8. A forming-machine comprising bearing members exerting a pressure one toward the other, a form or pattern for receiving thereon the blank to be formed, said form or pattern consisting of a curved part of the configuration to be imparted, and a rigid part bracing or staying said curved part in its given form, and means for causing said curved part and the blank thereon to pass between and receive pressure from said bearing members, for the purpose set forth.

9. A forming-machine comprising a pair of rolls exerting a pressure one toward the other a form or pattern for receiving thereon the blanks to be formed, said form or pattern consisting of a curved part of the configuration to be imparted, a rigid part for bracing or staying said curved part in its curved form, means for connecting the ends of said curved part to said brace or stay, and means for causing said curved part and the blank thereon to pass between and receive pressure from said roll, substantially as described and for the purpose set forth.

10. A forming-machine comprising a stationary roll and a movable roll, means for moving said movable roll toward and from said stationary roll, a movable form or pattern between said rolls, means for causing said form or pattern to move alternately in opposite directions, for the purpose set forth.

11. A forming-machine comprising a stationary friction-roll and a movable roll, means for moving said movable roll toward and from said stationary roll, a form or pattern for receiving thereon the blank to be formed, one side of said form or pattern having a friction-surface and means for rotating said stationary roll, substantially as described and for the purpose set forth.

12. A forming-machine comprising a stationary roll, a shaft having said stationary roll mounted rigidly upon one end thereof, a bevel-gear mounted upon the opposite end of said shaft, a driving-shaft at right angles to said first-mentioned shaft a bevel-gear upon one end of said driving-shaft and intermeshing with said first-mentioned bevel-gear, a pair of oppositely-driven pulleys upon said driving-shaft and loose thereupon, a clutch for rotatively connecting either of said pulleys to the drive-shaft, an idle roll, a bearing supporting said idle roll, means for adjusting said bearing and with it said idle roll toward and from said first-mentioned roll, a movable form or pattern in the form of a bow, means for securing a blank to be formed against longitudinal displacement relatively to said form or pattern said blank being located adjacent to said form or pattern, and means for moving said form or pattern and the blank therewith and causing same to pass between and receive pressure from said rolls, substantially as described and for the purpose set forth.

13. A forming-machine comprising a stationary friction-roll, a shaft having said stationary roll mounted rigidly upon one end thereof, a bevel-gear mounted upon the opposite end of said shaft, a driving-shaft at right angles to said first-mentioned shaft, a bevel-gear upon one end of said driving-shaft and intermeshing with said first-mentioned bevel-gear, a pair of oppositely-driven pulleys upon said driving-shaft and loose thereupon, a clutch for rotatively connecting either of said pulleys to the drive-shaft, an idle roll, a bearing supporting said idle roll, means for adjusting said bearing, and with it said idle roll, toward and from said first-mentioned roll, a form or pattern for receiving thereon the blank to be formed, said form or pattern consisting of a curved part having its exterior of the configuration to be imparted and its interior formed with a friction-surface, and a rigid part bracing or staying said curved part in its given form, said curved part and the blank thereon passing between and receiving pressure from said rolls, substantially as described and for the purpose set forth.

14. A forming-machine comprising bearing members exerting pressure one toward the other, a form or pattern for receiving thereon the blank to be formed, means for varying the configuration of said form or pattern and means for causing said form or pattern and the blank thereon to pass between and receive pressure from said bearing members, for the purpose of forming said blank in conformity to said form or pattern.

15. A forming-machine comprising bearing members exerting a pressure one toward the other, a form or pattern for receiving thereon the blank to be formed, said form or pattern consisting of a curved part of the configuration to be imparted, and a rigid part bracing or staying the said curved part in its given form, means for varying the arc of said curved part, and means for causing said curved part and the blank thereon to pass between and receive pressure from said bearing members, for the purpose set forth.

16. A forming-machine comprising bearing members exerting a pressure one toward the other, a form or pattern for receiving thereon the blank to be formed, said bearing members and said form or pattern with the blank thereon being moved one relatively to the other, with the form-roll blank between and receiving pressure from said bearing members, for the purpose of forming said blank in conformity to said form or pattern.

17. A forming-machine comprising bearing members exerting a pressure one toward the other, a form or pattern in the form of a bow, means for securing the blank to be formed against longitudinal and lateral displacement relatively to said form or pattern, and means for causing said form or pattern and the blank thereon to pass between and receive pressure from said bearing members for the purpose set forth.

In testimony whereof I have affixed my signature in presence of two witnesses.

BERNARD WILLIAM COGHLIN.

Witnesses:
WILLIAM P. MCFEAT,
FRED. J. SEARS.